United States Patent [19]

Kerz

[11] Patent Number: 5,469,516
[45] Date of Patent: Nov. 21, 1995

[54] METHOD FOR GENERATING AND STORING DIGITIZED DENSITY THRESHOLDS FOR RASTERING A HALF TONE ORIGINAL IMAGE

[75] Inventor: Ludo Kerz, Saulheim, Germany

[73] Assignee: Linotype-Hell AG, Eschborn, Germany

[21] Appl. No.: 366,385

[22] Filed: Dec. 29, 1994

Related U.S. Application Data

[63] Continuation of Ser. No. 66,144, Jul. 23, 1993, abandoned.

[30] Foreign Application Priority Data

Nov. 29, 1990 [DE] Germany .................... 40 38 057.2

[51] Int. Cl.$^6$ .................... G06K 9/40; H04N 1/40
[52] U.S. Cl. .................... 382/254; 358/536; 358/456
[58] Field of Search .................... 382/54, 50; 358/455, 358/456, 457, 459, 460, 533, 534, 536

[56] References Cited

U.S. PATENT DOCUMENTS

| | | | |
|---|---|---|---|
| 4,115,816 | 9/1978 | Moe et al. | 358/536 |
| 4,456,924 | 6/1984 | Rosenfeld | 358/536 |
| 4,499,489 | 2/1985 | Gall et al. | 358/536 |
| 4,547,812 | 10/1985 | Waller et al. | 358/459 |
| 5,022,089 | 6/1991 | Wilson | 382/45 |
| 5,166,809 | 11/1992 | Surbrook | 358/456 |

FOREIGN PATENT DOCUMENTS

| | | | |
|---|---|---|---|
| 2098022 | 3/1982 | United Kingdom | H04N 1/40 |
| 2145298 | 3/1985 | United Kingdom | H04N 1/40 |
| 2172169 | 9/1986 | United Kingdom | H04N 1/40 |
| WO90/05423 | 5/1990 | WIPO | H04N 1/40 |

OTHER PUBLICATIONS

Patent Abstracts of Japan, vol. 10, No. 379 (E–465), Jul. 31, 1986, "Picture Element Information Processing System", Tadao Shinya.

*Primary Examiner*—Leo H. Boudreau
*Assistant Examiner*—Matthew C. Bella
*Attorney, Agent, or Firm*—Hill, Steadman & Simpson

[57] ABSTRACT

The object of the invention is a process for generating and storing digitized density thresholds for defining the grid of a half-tone image. The density thresholds of a section of a grid are stored in a data store as stored words depending on a spot function. In the grid section, several spots with a number of stored words form a multiple grid spot and are periodically arranged beside and above one another. A sorted sequence is found for the stored words of the section in accordance with the spot function. Density thresholds are allocated to the stored words depending on the position in the sorted sequence. The actual number of stored words is found individually for each spot in the section. The sorted sequence is generated according to the current spot function. Before position-dependent thresholds are allocated to the stored words, a center of concentration and possibly final point correction is performed for the spot concerned.

2 Claims, 10 Drawing Sheets

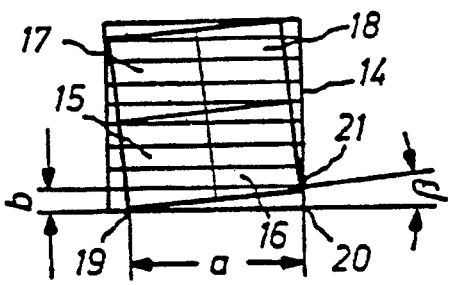
Fig. 1
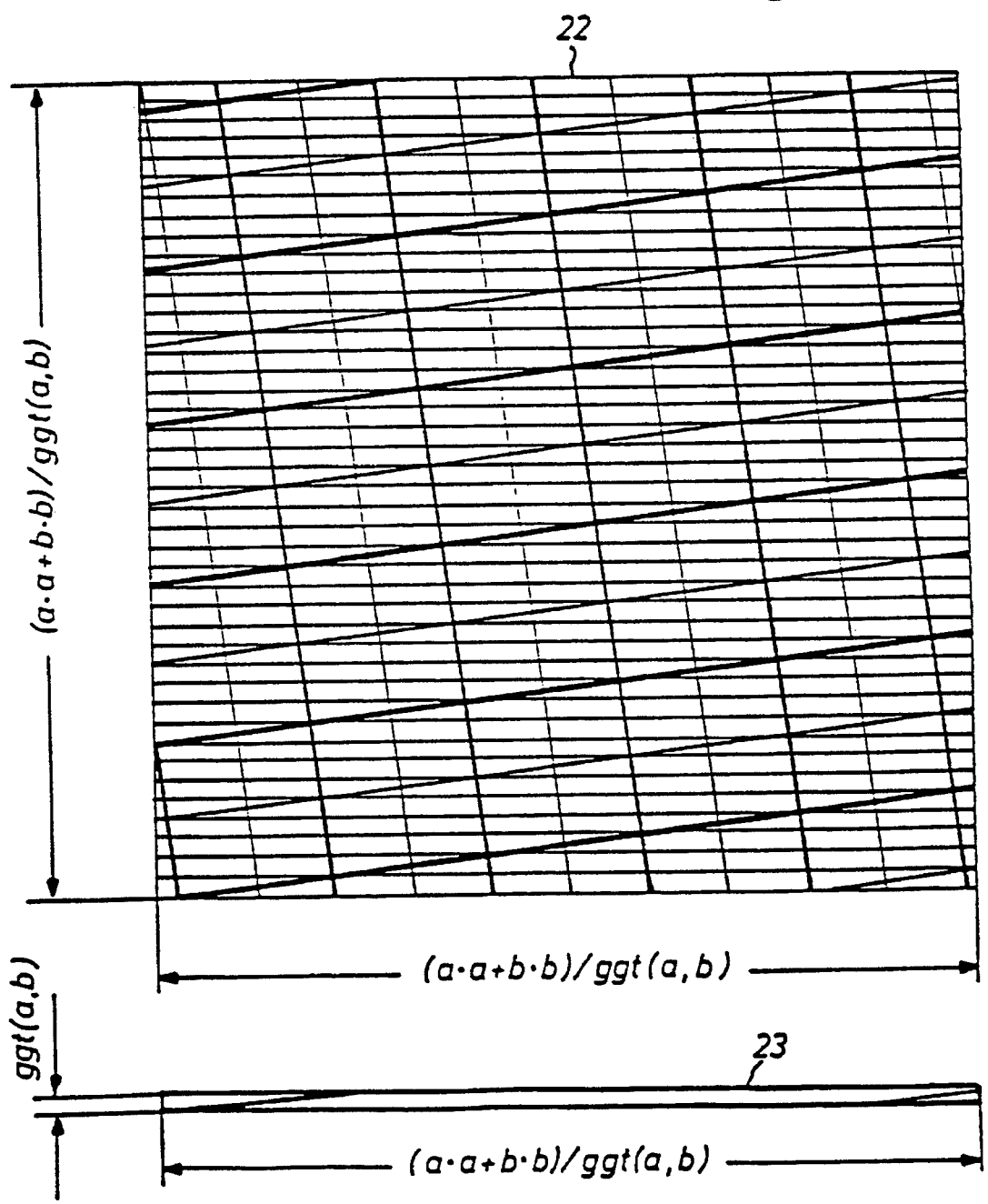
Fig. 2
Fig. 3

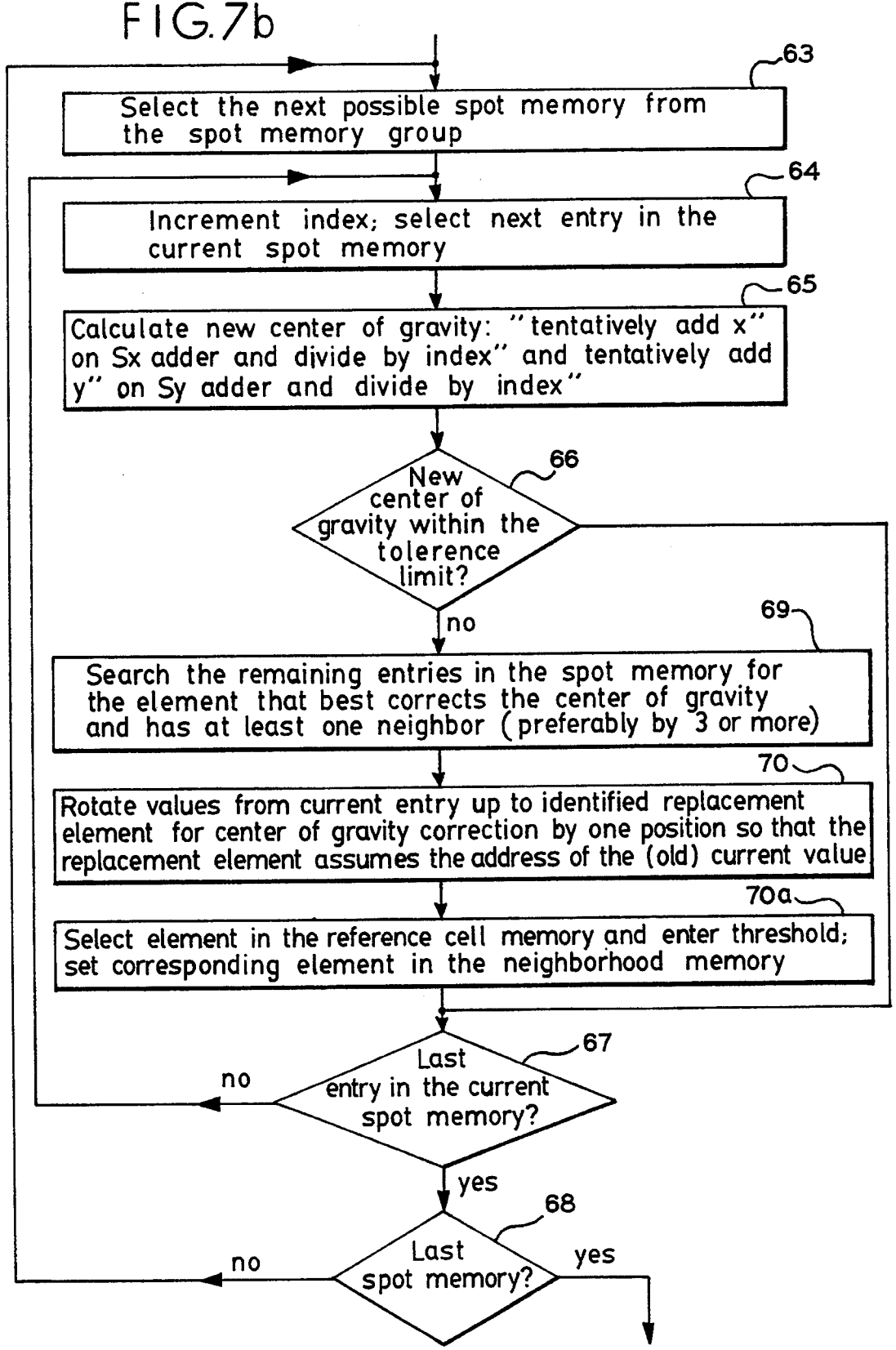

METHOD FOR GENERATING AND STORING DIGITIZED DENSITY THRESHOLDS FOR RASTERING A HALF TONE ORIGINAL IMAGE

This is a continuation of application Ser. No. 08/066,144, filed Jul. 23, 1993, now abandoned.

BACKGROUND OF THE INVENTION

The invention is directed to a method for generating and storing digitized density thresholds for rastering a half-tone original image, particularly in the form of a color separation (plans), whereby the density thresholds of a portion of a raster are stored in at least one data memory as memory words dependent on a spot function, whereby a plurality of spots (raster points) in the portion that respectively cover a plurality of memory words are periodically arranged next to one another and above one another, forming a multiple reference cell (super cell), whereby a sorted sequence based on the measure of the spot function is calculated for the memory words of the data memory, and wherein density thresholds are allocated to the memory words of the data memory dependent on the position of the memory word in the sorted sequence.

The raster can thereby be turned relative to a scan direction of a recording means that scans a recording carrier along scan lines.

Limiting lines of the portion of the raster proceed in the scan direction as well as at a right angle relative thereto.

It is known for the rastered recording of tonal value signals (image signals) that are acquired by scanning the half-tone original image, to superimpose these tonal value signals with density threshold signals (raster signals) of a raster that is turned relative to a recording direction (German Patent 19 01 101). The density threshold signals or, respectively, raster signals generated for this purpose correspond to a density structure content of a portion taken from the selected, turned raster whose limiting lines lie in the recording direction and in a feed direction that is orthogonal thereto. The basic period of the structure of the turned raster with respect to each of the two orthogonal directions is contained once in the portion. The portion thereby comprises a plurality of raster points (spots) in the scan direction as well as at a right angle thereto, these spots being periodically arranged next to one another and above one another. This portion can also be referred to as a multiple reference cell or a super cell. As a consequence of the periodicity of the portion of the turned raster, the density threshold signals (raster signals) can be periodically repeated without further ado in order to be superimposed with the tonal value signals of larger image formats or, respectively, image portions. Over and above this, the raster portion can be resolved into so many sub-lines proceeding in the image recording direction that a plurality of such sub-lines devolve onto one image line width.

As a result of this subdivision of the raster portion, however, nothing regarding the size and periodicity thereof is changed. The condition that the raster portion seamlessly merges into itself in each of the two orthogonal directions (vertically and horizontally) is referred to as the wrap-around condition.

Data memories wherein the density thresholds of the raster portions are digitally stored are utilized for the implementation of the described, known method. The density thresholds stored therein, imaged visually, can also be referred to as density hills or, respectively, threshold hills. The density thresholds are stored in the data memories in such a form that the required raster information are input by previous scanning of a model raster and quantizing as well as coding of the raster signals. The digital density thresholds thus contained in the data memories serve the purpose of being converted back into analog values with the tonal value signals scanned line-by-line from the original image and of being subsequently supplied into superimposition and threshold units. Typically, round, oval or rectangular point forms that grow proceeding from the middle are employed when scanning an optical original.

Digital recorders are also used in order to expose the individual color separations. A light source, particularly a laser beam, for exposing a light-sensitive surface therein, is capable of being displaced with constant step size in two orthogonal directions. The light source is thereby switched on or off in clocked fashion in order to expose or not expose small picture elements. These picture elements are referred to as dots or pixels. Since a high resolution of the recorder is desirable, the memory requirement for storing the portion of the raster structure wherein the density thresholds are contained becomes correspondingly high. Since a raster point or spot in digital recorders is constructed by a plurality of neighboring pixels, all the more gray scales can be realized as there are pixels available for constructing the spot. For converting an original image into the pixels to be exposed, the digitally working recorder is preceded by a known means referred to as a raster image processor wherein user preset values such as raster width, raster angle and gray scale values are converted in the generation of the signals stored bit-by-bit for the pixels to be exposed. In this means, thus a pixel is represented by one bit in a memory organized in bit fashion whose totality is referred to as a bit map. In a data memory of the means, at least one raster point or spot of a raster portion is presented by data words that represent the density thresholds. This memory content, referred to as a reference cell or as a reference cell memory, has a width of m words and a height of n words. Width and height of the reference cell are also referred to as columns and rows. A word of the reference cell is allocated to every pixel of the bit map. The numerical values of the words of the reference cell, which represent the density thresholds, thus define the sequence in which the bits are to be placed for increasingly darker gray. The density thresholds in a reference cell are defined by a prescribed spot function, so that a raster point or spot can assume many forms. The content of the reference cell is worked off when, for digitized rastering of the half-tone original image, the tonal value signals thereof are compared to the density thresholds and, dependent on the result of the comparison, a bit which represents the status of a pixel and which is part of a bit map in the memory structured in bit fashion is set or not. As a consequence of its periodicity, the handling of the reference cell can simply occur such that, for example, the density thresholds along a row are interrogated and, when the right-hand edge is reached, a new placement is made in the same row at the start of the reference cell.

Given turned rasters, when the raster angle is unequal to zero, the corner points of a spot must lie on rational pixel coordinates in order to preserve the periodicity. The edges of the spot can thereby be limited in step-shaped fashion. Large reference cells having a corresponding memory requirement are thereby necessary for producing the periodicity or wrap-around condition.

The problem as to how the density thresholds to be stored are expediently formed in detail in order to reproduce a half-tone original image in such rastered fashion that the half-tone image acts uniformly or, respectively, "at rest" over a sub-area that has the same tonal value, is thereby not treated for that instance wherein the thresholds are not digitally formed by scanning an optical original, but are fully digitally formed according to the measure of a two-dimensional function. This function is also referred to as a spot function. For the full digital generation of the density thresholds of the raster points of a multiple reference cell (super cell) in the prior art known from practice, the total number of memory words of the multiple reference cell is first determined. The determination of the total number can occur based on the measure of the raster angle, of the raster width and according to the resolution of the system. A sorted sequence of memory words of the multiple reference cell is then formed based on the measure of the spot function. Density thresholds are then allocated to the memory words of the multiple reference cell in linear dependency on their position in the sorted sequence. In fact, the individual raster points (spots) of a multiple reference cell (super cell) differ somewhat insofar as the plurality of memory words allocated for one of the raster points fluctuates at the individual raster points and usually does not correspond to the rated value calculated from the total plurality of memory words of the multiple reference cell and from the plurality of the raster points or subcells. This results in more or fewer pixels being set in neighboring raster points when, based on the measure of a specific gray tint, a defined fraction of all of the pixels allocated to the multiple reference cell is to be blackened. The impression of black points of different size on a white ground thereby arises for the viewer of the reproduced half-tone original image, at least when the gray scale value amounts to substantially less than 50%. When, by contrast, a darker gray tint that lies considerably above 50%, for example at 70%, is reproduced upon employment of a multiple reference cell, then the impression of light spots of different size on a black ground arises here for reasons that are similar to those set forth above for low gray scale values. In both instances, the reproduced half-tone image makes a restless impression.

It is therefore expedient to undertake a correction of gray scale value with which a half-tone image original is rastered such that the impression of the half-tone image reproduced according to it is uniform or at rest. For correction of gray scale value, an average number of memory words of the spot of the portion of the raster can preferably be calculated, and can be compared to the actual number of memory words of respectively one spot. Dependent on the result of the comparison, the density thresholds to be allocated are raised for a comparatively large number of memory words for positions at the start of the sorted sequence of memory words of the spot. This means that the plurality of pixels to be blackened for low gray scale values when recording is reduced, and this can be referred to as under-drive. Given a relatively low plurality of memory words of the spot, the density thresholds to be allocated are lowered, as a result whereof the plurality of pixels to be blackened for low gray scale values is increased, and this can be referred to as over-drive. Given a comparatively large plurality of memory words for positions at the end of the sorted sequence of memory words of the spots, the density thresholds to be allocated are lowered and, as a result thereof, the plurality of pixels to be blackened for high gray scale values is super elevated, i.e. over-driven. Given a relatively low plurality of memory words of the spot, the density thresholds to be allocated are raised and, as a result thereof, the plurality of pixels to be blackened for high gray scale values is lowered, i.e. under-driven.

When, as is standard, the spots (raster points) grow proceeding from the middle, white spots are concentrated in the corners of the respective raster point given dark tints. As a result thereof, disturbing, different sizes of white points between the blackened raster points can occur. The reproduced image can therefore make a restless impression. This effect can be eliminated with a correction of white value, this being expediently comprised therein that every spot is subdivided into four quadrants and, given relatively high gray scale values (greater than 50%), a square (spot) subject to the correction of gray scale value is composed of respectively one quadrant of four neighboring spots.

The corrections of gray scale value and white value generally yield good results. In individual cases, disturbing patterns can still derive, particularly in the ranges of the raster angles of $0 \pm 2$ degrees and $45 \pm 2$ degrees. Since the spots are arranged in grid-like fashion, the possibility of the formation of grid lines exists. The problem of a different point closure arises as a further cause of a restless image in the ranges of the raster angles from 0 through $\pm 2$ degrees and 45 through $\pm 2$ degrees. What is to be understood by this is that neighboring raster points touch with increasing gray scale value beginning with a certain gray scale value. The point closure occurs at a different gray scale value for specific positions of the spot boundaries. This disturbance also tends to the formation of grid lines.

SUMMARY OF THE INVENTION

The invention is based on the problem of improving a method for generating and storing digitized density thresholds for rastering a half-tone original image of the type initially set forth such that density thresholds—for example, given raster angles in the ranges from 0 through $\pm 2$ degrees and 45 through $\pm 2$ degrees—are always generated with which a half-tone original image is rastered such that the impression of the half-tone image produced in accordance therewith is uniform or, respectively, at rest.

This problem is essentially resolved in that the center of gravity deriving for the spot is calculated before allocation of the density threshold of a current element of a spot of a portion of the raster. A substitute element is defined given deviations from the prescribed center of gravity. The density threshold is assigned to this substitute element. In particular, it is proposed that the actual number of memory words is individually identified for every spot of the portion of the raster and a sorted sequence of memory words is generated for every spot according to the measure of the spot function; in that the deriving center of gravity is identified for every word of the memory words allocated to a spot and is compared to a prescribed tolerance limit. Given crossing of the tolerance limit, the remaining elements of the sequence are searched for a substitute element, taking the center of gravity into consideration, and a density threshold is assigned to the corresponding memory word of the substitute element of the portion of the raster when the calculated change does not cross the tolerance limit, a density threshold being assigned to the corresponding memory word of the portion of the raster when the calculated change does not exceed the tolerance limit. A center of gravity correction with which the formation of disturbing patterns and grid lines is prevented is thus implemented.

It is provided in a preferred embodiment that the function value of the spot function is first generated for every element of the reference cell and is intermediately stored in a spot memory that contains the function value and coordinate values for each element of the reference cell. The function value and the coordinate values are stored in ascending sequence of the function values. Subsequently, the coordinates of the center of gravity are calculated in successive work cycles for every element of all spot memories of a reference cell and are compared to the tolerance limit. Given observation of the tolerance limit, a reference cell memory is addressed with the coordinate values, a density threshold that is dependent on the position and on the plurality of entries in the current spot memory are stored in said reference cell memory. Given crossing of the tolerance limit, the remaining entries of the current spot memory for the calculation of the coordinates of the center of gravity are searched for that element where the tolerance limit is observed. Subsequently, a check is carried out to see whether density thresholds are assigned to neighboring elements. The elements of the spot memory are resorted in ring-like fashion between the current element and the defined substitute element. The density threshold is assigned to this substitute element.

The center of gravity correction is based on the following principle. A check is carried out with a list of the sorted sequence of the memory words as to how the center of gravity would change if the next threshold were assigned to the next element in the list. When an error limit or the tolerance limit is crossed, then the remaining elements of the list are examined to see whether one of these would lead to a better result. If yes, then the list is resorted and the threshold is assigned to the more suitable element. It should be noted that no free-standing pixels are generated in order to obtain a compact point form. This occurs in that an additional check is carried out to see whether the element has neighbors to which thresholds have already been assigned.

Additionally or beside the center of gravity correction of the invention, a point closure correction can be implemented, this being distinguished in that a check is carried out for every element that lies in the edge region of a spot of the portion of the raster to see whether the element causes a point closure in the previously defined tonal value region. Given deviations, transpositions of the elements of the spot are undertaken for the correction of the point closure. Density thresholds are then assigned to the elements of the spot. The invention is particularly distinguished in that the actual plurality of memory words is individually identified for every spot of the portion of the raster and a sorted sequence of the memory words is generated according to the measure of the spot function. An edge zone along the four edges of the spot is prescribed for every spot as a test region for a point closure. The tonal value regions wherein the boundary regions of a spot are blackened are identified in advance for the respective spot function. Every sorted memory word is checked to see whether it belongs to an edge zone. Given affiliation to the edge zone, a check is carried out to see whether it is blackened for the given spot function and the position of the memory word in the prescribed tonal value region. Given deviations therefrom, transpositions in the sorted memory words of the spot are implemented, taking neighboring memory words into consideration for observing the tolerance limits. The density thresholds are subsequently assigned. What is achieved by the point closure correction is that all pixels that cause the point closure are set at approximately the same gray scale value in all spots. For compensation, other pixels are set earlier or later.

It is provided in a preferred embodiment that the function value of the spot function is generated for every element of the reference cell and is intermediately stored in a spot memory that contains the function values and coordinate values for every element of the reference cell. The function values and the coordinate values are stored in ascending sequence of the function values. Subsequently, the position of the element in the edge zone is checked, on the one hand, and, on the other hand, a model spot memory is addressed in successive work cycles with the coordinate values of the entries in the spot memory. A switch is made to the next element given an element lying outside the edge zone. Given an element lying inside the edge zone, the content of the respective spot memory element is compared to the content of the addressed cell of the model spot memory. A switch is made to the next element when the contents of the model spot memory and of the spot memory coincide within the tolerance limit. A check for lower or higher is made given deviations from the tolerance limit. Given a lower value in the spot memory, an element of the spot memory is sought that does not lie in the edge zone and that has neighboring elements and that is transposed with the other element. Given a higher value in the spot memory, the prescribed entries are searched from the current position in descending sequence for an element outside the edge region having optimally few neighboring elements, whereby the identified element takes the place of the other element by resorting. The density thresholds are subsequently assigned in successive work cycles.

Preferably, a first, orthogonal coordinate system is allocated to the reference cell memory and a second orthogonal coordinate system rotated by an angle compared to the first coordinate system is allocated to the spots.

Further details, advantages and features of the invention derive not only from the claims, the features to be derived therefrom—by themselves and/or in combination—, but also derive from the following description of preferred exemplary embodiments to be derived from the drawing.

BRIEF DESCRIPTION OF THE DRAWINGS

FIG. 1 illustrates a rotating multiple spot that is composed of twice two quadratic spots or raster points arranged above one another and next to one another, and that is arranged in a smallest comparison field at whose edges its corners are adjacent;

FIG. 2 shows a multiple reference cell wherein a plurality of rotated multiple spots are joined to one another;

FIG. 3 illustrates a reduced portion as a reference region from the multiple reference cell, whereby the portion is significantly smaller than the multiple reference cell in one of the two orthogonal directions, namely the height, and whereby the invention can also be applied to the reduced portion as a reference region;

DESCRIPTION OF THE PREFERRED EMBODIMENTS

Figure 4:
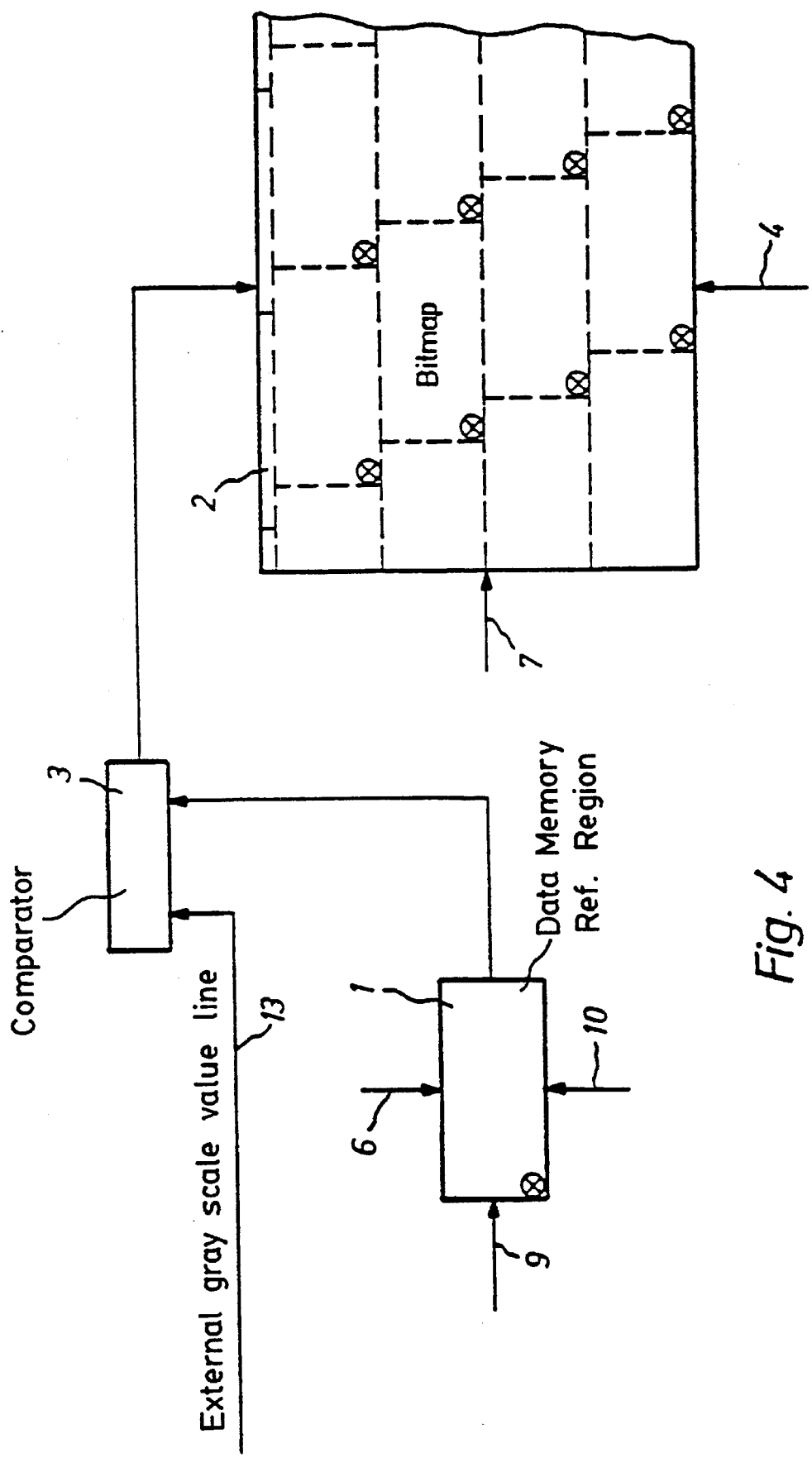
FIG. 4 shows a simplified sub-structure of an apparatus for the digitized rastering of a half-tone original image.

In FIG. 1, 14 references a smallest comparison field wherein n·n spots or raster points 15 through 18, with n= two, are arranged turned next to one another and above one another, so that the entire arrangement is uniformly turned in comparison to the smallest comparison field. The raster points of the multiple spot are also referred to as subcells. In the smallest comparison field, the quantity a and b are defined by the arrangement of the multiple spot, whereby a is the distance of a corner point 19 of the group of spots 15 through 18 from the corner 20 of the comparison field. The quantity b is the distance oriented at a right angle relative thereto between this corner 20 of the comparison field and another corner point 21 of the group of spots. A raster angle is referenced β, the group of raster points or spots 15 through 18 being turned by this angle in comparison to the recording direction that proceeds parallel to the two edges of the smallest comparison field 14.

Due to the grouping of a plurality of spots in the smallest comparison field, as set forth with reference to FIG. 1, the raster angles and raster widths can become arbitrarily fine with an increasing plurality of spots, upon observation of the condition that the corners of the group of spots should always be allocated in defined fashion to respectively one of the pixels of the comparison field subdivided into pixel spacings, or should hit on this pixel.

The plurality of memory words per spot fluctuates because of a digitization effect that is based on the allocated of the memory words to a spot at the imaginary limiting line thereof. The memory words whose centers lie within the limiting lines of the spot are allocated to the spot. The actual value of the memory words in the spot derives therefrom.

The requirement for periodicity of the multiple reference cell 22 that is constructed with such multiple spots normally leads to comparatively large multiple reference cells, since the groupings of the spots are repeated until the periodicity or wrap-around condition is established in each of the two orthogonal directions of the multiple reference cell.

The reference region 23 shown in FIG. 3 represents a defined portion from the multiple reference cell according to FIG. 2. The extent of the reference region in one of the two orthogonal directions, namely the width, which is the same as that of the multiple reference cell, namely $$w = \frac{a \cdot a + b \cdot b}{ggt(a,b)}$$

In the direction orthogonal thereto, namely the height, however, the extent of the reference region is considerably reduced in comparison to that of the multiple reference cell, namely by h= ggt(a,b), whereby this value h represents the greatest common devisor of a and b (given the quadratic pixels assumed here the width or height of a pixel).

Further, the reduced portion 23 is equal in area to the multiple spot of FIG. 1. w·h= (a·a+ b· b) is valid.

The offset with which one must respectively enter into the reference region of FIG. 3 when scanning in the scan line direction or in the width direction once the density thresholds have been read out from this reference region, amounts to 57 here, given a width of 65. In the direction of the scan line X (where X is not shown in the figure), the respectively new X-position at which the read-out of the density thresholds begins:

$$X_{new} = (X_{old} + \text{offset}) \text{ modulo } w.$$

Therein, the width w is:

$$w = \frac{(a \cdot a + b \cdot b)}{ggt(a,b)}$$

The density thresholds, also simply referred to as thresholds below, are prescribed primarily by a spot function for every memory word of the multiple reference cell—or of the reduced portion—of a spot or, respectively, of a raster point. The aspects of the present invention relate to corrections of these density thresholds prescribed by the spot function.

In highly simplified fashion, FIG. 4 shows the structure of a means with which the method is carried out for digitized rastering of a half-tone original image upon employment of a data memory wherein only the density thresholds of a reduced portion of a raster 23 according to FIG. 3 rotated by comparison to the scan direction are stored. As part of a raster image processor, the apparatus of FIG. 4 contains the means in order to store signals dependent on a comparison result for brightness modulation/blanking of a recording means not shown in FIG. 4 in a bit map 2, as though a multiple reference cell 22 according to FIG. 2 were available as a complete portion of the raster for the comparison of tonal value signals of a half-tone original image with prescribed thresholds that has been scanned and is to be rastered.

Density thresholds of the reference region, which only represents a reduced portion, are stored in the data memory of the reference region 1 according to a spot function with following corrections, and are addressable column-by-column as well as row-by-row. The bit map 2 can likewise be addressed column-by-column and row-by-row, so that individual memory locations (bits) are to be set or not in accordance with a comparison implemented in a comparator 3.

An input 4 serves for column addressing of the bit map 2 and an input 7 serves for row-by-row addressing. The row-by-row addressing of the data memory of the reference region 1 occurs at an input 9, and an input 6 is provided at the data memory 1 for the offset addressing of the reference region in which the density thresholds of a reduced portion of the raster are stored.

For clocked operation of the apparatus shown in FIG. 4, first a bit of the bit map 2 is addressed at every clock pulse and, second, a threshold in the data memory 1 of the reference region is addressed, this corresponding to the addressed bit. The threshold signal therefore pending at the output of the data memory 1 is compared in the comparator 3 to a tonal value signal on the gray scale value line 13 which has arisen by scanning the half-tone original image and, potentially, by subsequent signal processing. The result of this comparison implemented in the comparator 3 is entered in binary form into the bit addressed in the bit map 2, as set forth above, this being thus set or not according to the measure of the tonal value and of the addressed location of the reference region. This content is read out from the bit map 2 for brightness modulation/blanking of a recording means which is not shown.

The following, detailed description of the method of the invention, from which further features and advantages derive, proceeds on the basis of a reference region of the multiple reference cell according to FIG. 3 which was set forth further above. This reference region contains n·n raster points (spots).

Two different coordinate systems that have a specific relationship to one another shall be referenced for explanation. For simplification, it is assumed here that both coordinate systems are orthogonal and have identical scalings for both axes.

The first coordinate system is that of the bit map, see 2 in FIG. 4. The bit map is an image of the pixels of the reproduction means. Each bit of the bit map has the width and the height of one unit. The axes are referenced x and y.

The second coordinate system is that of the spots, whereby a spot has the width and height 1. The axes are referenced x' and y'. As a rule, this x', y' coordinate system is rotated by an angle $\beta$ relative to the x, y coordinate system.

A conversion of x, y coordinates into x', y' coordinates can occur according to the following equations:

$$x' = k \cdot x \cdot \cos\beta + k \cdot y \cdot \sin\beta$$

$$y' = k \cdot x \cdot \sin\beta + k \cdot y \cdot \cos\beta,$$

whereby the constant k is the conversion factor of a length unit of the x, y space into the x', y' space.

The center of a pixel is considered as coordinates of a pixel. The coordinates of the pixel in the origin of the x, y space are therefore 0.5|0.5 and not 0|0, as perhaps anticipated.

The following definitions are also made. The desired gray scale value is represented by a whole number between 0 and $g_{max}$, whereby $g_{max}$ is the maximum threshold. The gray scale value 0 corresponds to black (100% color) and $g_{max}$ corresponds to white (0% color). In order to not realize the gray scale value g, all bits of the bit map whose corresponding values in the reference cell contain values below g would be set to 1. The values of the reference cell are defined as follows:

$$sw = m_o \cdot i + 1$$

whereby:
sw= threshold
i= position of the element in the sorted list $$m_o = \frac{g_{max}}{\text{plurality of list elements} + 1}$$

The continuous assigning of the thresholds is thus assured.

The procedure is to be repeated for all subcells (= spots) for the reference region according to FIG. 3 in order to assign a threshold to all elements of the reference region.

Every spot in a multiple spot contains the same number of elements only in theory. In practice, however, this number fluctuates, due to the digitization effects of the ideal spot. A distinction is therefore made between a rated value and an actual value. The actual value of a spot derives by counting out the elements after the digitization of the edges of the spot. The rated value derives from:

$$\text{rated} = \frac{a \cdot a + b \cdot b}{n \cdot n}$$

As already set forth above, black (or, respectively, white) spots of different size derive in the various spots of the multiple spot from the difference between rated and actual given a specific gray scale value.

In order to implement the under-drive and over-drive correction set forth in general above for equalizing the black (or, respectively, white) spots of the spots, the threshold is generated according to the measure of a function that is subdivided into three sections (function regions):

1. Section for $0 < i <$ actual value·$s_1$ $$sw = f_1(i) + 1 = m_{rated} \cdot i + 1$$

whereby $$m_{rated} = \frac{g_{max}}{\text{rated value} + 1}$$

2. Section for actual value·$s_1 < i <$ actual value·$s_2$:

$$sw = \frac{s_2 - i}{s_2 - s_1} \cdot f_1(i) \frac{i - s_1}{s_2 - s_1} \cdot f_2(i) + 1$$

3. Section for actual value·$s_2 < i <$ actual value:

$$sw = f_2(i) + 1 = m_{rated} \cdot i + b + 1$$

whereby:

$$b = m_{rated} \cdot (\text{rated value} - \text{actual value}).$$

The values $s_1$ and $s_2$ fulfill the mathematical in equation $0 < s_1 < s_2 < 1$ and are empirically identified. Values of approximately 0.3 and 0.7 for $s_1$ and $s_2$ have proven useable in practice. The relationship for the second section effects a continuous transition from $f_1(i)$ in the first section to $f_2(i)$ in the second section. In the fashion of a fine tuning, it is more involved to employ more sections or functions of a higher order or other types of the transition in the second section. The errors that derive from deviations of the actual value of the pixels of a spot from the rated value are completely corrected in the first and third section. When the actual value of a spot deviates to an especially pronounced degree from the rated value, then this is still obvious in the middle, second section. This can be alleviated in that a tolerable error dependent on the actual value is allowed in the sections 1 and 3 in order to somewhat homogenize the spots relative to one another in the second section.

For a white correction, the spots are additionally subdivided into quadrants that are respectively differently combined for gray scale values from 0 through 50% and 50 through 100%. The correction of the gray scale value is thereby also divided in two.

The gray correction and the white value correction generally lead to good results.

However, disturbing patterns (particularly in the medium tonal values) still turn up, particularly in the regions 0± 2 degrees and 45± 2 degrees given n> 3. This stems, among other things, from the fact that the center of gravity of individual spots drifts away. These spots are arranged grid-like, this leading to the formation of grid lines. In order to overcome this, it is necessary to correct the center of gravity of the spots.

Given standard spot functions, the ideal center of gravity always lies in the center of the spot. Under real conditions, however, it deviates in the one direction on the one hand and in the other direction on the other hand, dependent on the gray scale value. Given special rasters (for example, line grids), the center of gravity migrates with the gray scale value. It is then necessary to identify the path of the center of gravity dependent on the threshold with reference to a model calculation, and to use this as a rated value. Since this has no influence on the correction method in and of itself, this shall not be explained in greater detail here. It is assumed that the center of gravity lies in stationary fashion in the middle of the spot.

The general mathematical definition of the center of gravity of an area reads:

$$S_x = \frac{\Sigma A_i \cdot x_i}{\Sigma A_i} \text{ and } S_y = \frac{\Sigma A_i \cdot y_i}{\Sigma A_i}$$

whereby $S_x$, $S_y$ indicate the center of gravity coordinates in the x and y directions, A indicates the area, x and y indicate the coordinate distances of the areas from an origin, and i indicates the index of the areas.

In our case, the area elements indicate the device pixels. Since these all have the area content 1, the expressions are simplified to read:

$$S_x = \frac{\Sigma x_i}{i} \text{ and } S_y = \frac{\Sigma y_i}{i}$$

whereby: i= plurality of device pixels.

In order to identify the center of gravity of a spot, one thus need only add up the x' and y' coordinates of the thresholds within the given spot in continuous fashion and divide this by the plurality.

The correction itself is undertaken in the following way. A check is carried out in the sorted list to see how the center of gravity changes when the next threshold is assigned to the next element in a list, as already set forth. An error or, respectively, tolerance limit is prescribed, this deriving, for example, as an empirical value. When the tolerance limit is crossed, then the remaining elements of the list are investigated to see whether one of these would lead to a better result. When this is true, then the list is resorted and the threshold is assigned to the more suitable element. It should thereby be noted that no free-standing pixels are generated in order to obtain a compact point form. This occurs by checking to see whether the element has neighbors to which thresholds were already assigned.

Figure 5:
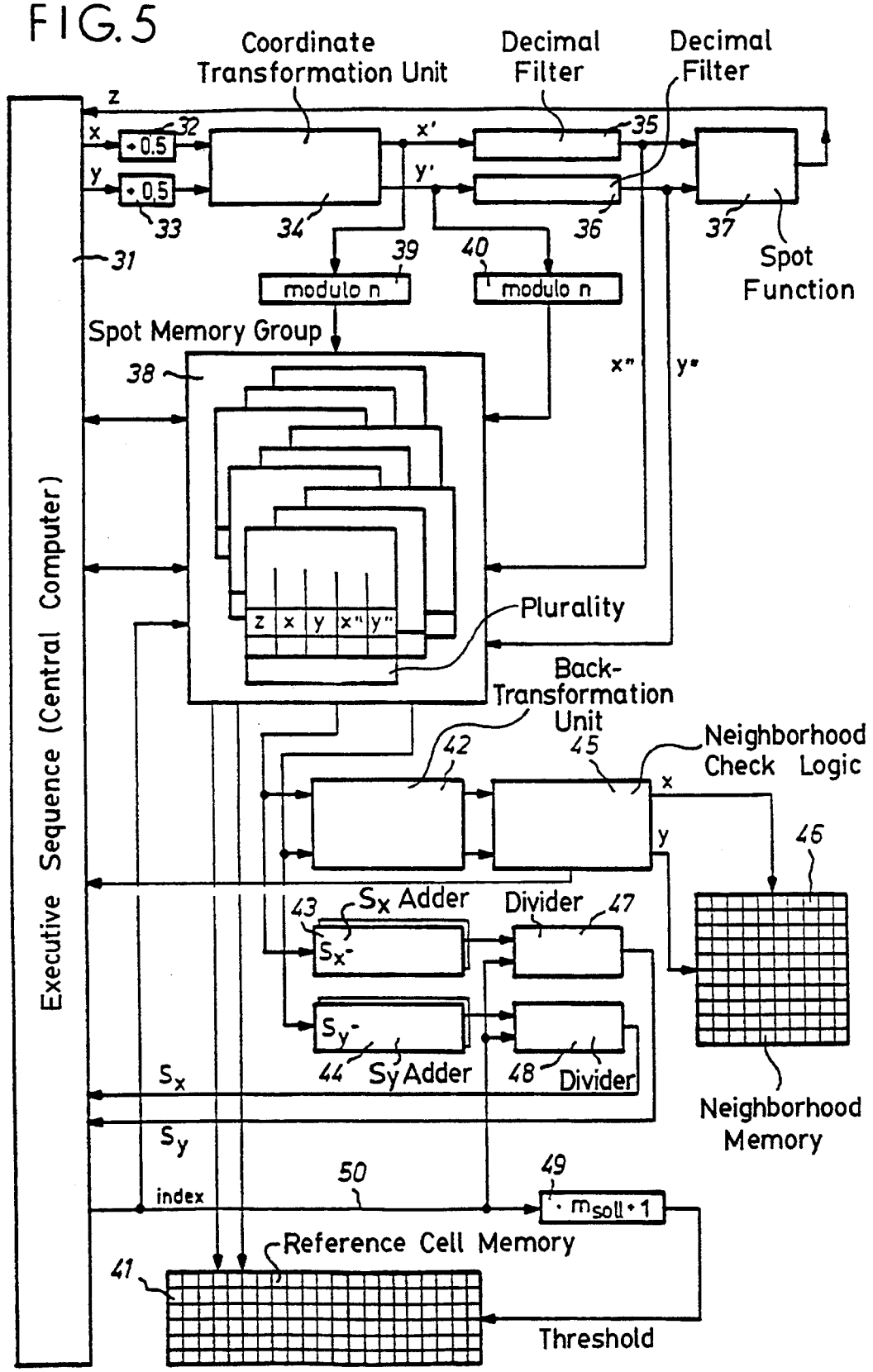
FIG. 5 is a block diagram of an exemplary apparatus for center of gravity correction.

FIG. 5 shows a circuit diagram of an arrangement for center of gravity correction having a central executive sequencer 31 in the form of a data processing means, for example a computer. Furthermore, two adders 32, 33 are provided that are connected to the executive sequencer 31 or are included among its component parts. The adders 32, 33 are followed by a coordinate transformation unit 34 to which decimal filters 35, 36 are connected, these being followed by a spot function generator 37. Furthermore, a spot memory group 38 is provided, for example in the executive sequencer 31. The spot memory group 38 is addressed by modulo units 39, 40.

A reference cell memory 41, a back-transformation unit 42, as well as adders 43, 44 can be applied to the outputs of the spot memory group 38. The back-transformation unit 42 is followed by a neighborhood check logic 45 that is connected to a neighborhood memory 46. Respective dividers 47, 48 whose outputs are connected to the executive sequencer 31 are connected to the adders 43, 44.

The dividers 47, 48 and a multiplier and adder 49 are connected to an output for index values of the executive controller 31 via an index line 50. The latter supplies the reference cell memory 41 at its output side. The reference cell memory 41 is identical in shape and size to the reduced portion 23 of FIG. 3.

First, the function value of the spot function is identified for every element of the multiple reference cell and is intermediately stored in spot memories of the spot memory group 38. For this purpose, the executive sequencer 31 successively generates all possible value pairs for x= 0 ... (w–1) and y= 0 ... (h–1) of the first coordinate system. The following description of the events is repeated for all value pairs.

First, 0.5 is added both to x as well as to y in the adders 32, 33 in order to describe the center of the element to be processed. This value pair is then transformed into the value pair x' and y' in the coordinate transformation unit 34. The value pair x' and y' proceeds, first, to the decimal filter units 35, 36 that allow only the places following the decimal point to pass. x" and y" are then available at the outputs of the decimal filters 35, 36 and are supplied to the spot function generator 37. The result z of the spot function of the processed element of the reference cell memory is available at the output of the spot function generator 37.

Second, x' and y' are utilized for the identification of that spot memory of the spot memory group 38 wherein current values are stored. This occurs in that x' and y' are imaged onto the region 0 ... (n–1), 0 ... (n–1) by applying modulo n in the modulo units 39, 40. This value pair acquired in this way respectively selects a spot memory of the spot memory group 38.

The spot memory group itself is composed of n·n spot memories. Every spot memory is composed of a memory area, whereby a data quintet can be stored under every address. This quintet is composed of the spot function value z, of the value pair x/y and of the value pair x"/y". Further, there is a register (not shown) in the spot memory group that stores the plurality of used entries and can be referred to as a plurality register. The values z, x/y and x"/y" are sorted in the selected memory block in ascending sequence for the spot function value z. Moreover, the content of the plurality register is incremented by the value 1.

Next, the thresholds for the reference cell memory are assigned. This occurs in n·n work cycles, whereby one spot memory is handled in every work cycle. In every work cycle, entry-by-entry in the selected spot memory is sequentially addressed by the executive sequencer 31 on the basis of the index line 50. The x" and y" values of the currently addressed entry in the spot memory proceed to respectively $S_x$ and $S_y$ adders 43, 44, and are tentatively added up therein. The result is divided in the following divider 47, 48 by the current index value. Their output signals describe the coordinate values $S_x$, $S_y$ of the center of gravity. When the center of gravity is within a prescribed tolerance limit, then the executive sequencer 31 uses the values x and y for addressing an element from the reference cell memory. Index value·$m_{rated}$+ 1 is entered in this element as a threshold. Moreover, x" and y" are back-transformed into x/y coordinates by the back-transformation unit 42 and are used by the neighborhood check logic in order to set the elements selected in this way from 0 to 1 in the neighborhood memory 46. The ones entered in the neighborhood memory 46 correspond to the current point shape.

When the tolerance limit is transgressed, then the remaining entries in the selected spot memory are searched for that element that best corrects the center of gravity. Only the elements are thereby taken into consideration where the neighborhood check logic 45 comprises at least one or more elements that are set to one, for example, in the 8 neighboring elements of the corresponding element of the neighborhood memory 46. When this is not the case, then this is a matter of a free-standing pixel and the entry does not come into consideration as a substitute value. After the best substitute value has been identified, the entries in the spot memory are correspondingly shifted in ring-like fashion. Example: assuming the index value is 5 and the substitute value is 9, then the entries 5, 6, 7 and 8 would be shifted by one position to 6, 7, 8 and 9 and the (old) content of 9 would be copied onto the address 5. If the values 5 and 9 were simply interchanged, then this would result in undesired deviations from the point shape. Subsequently, the threshold is assigned according to the x/y coordinates of the substitute value (in the example, the entry that was copied from address 9 onto 5), and the element corresponding to x″ and y″ in the neighborhood memory is set to 1.

Figure 6:
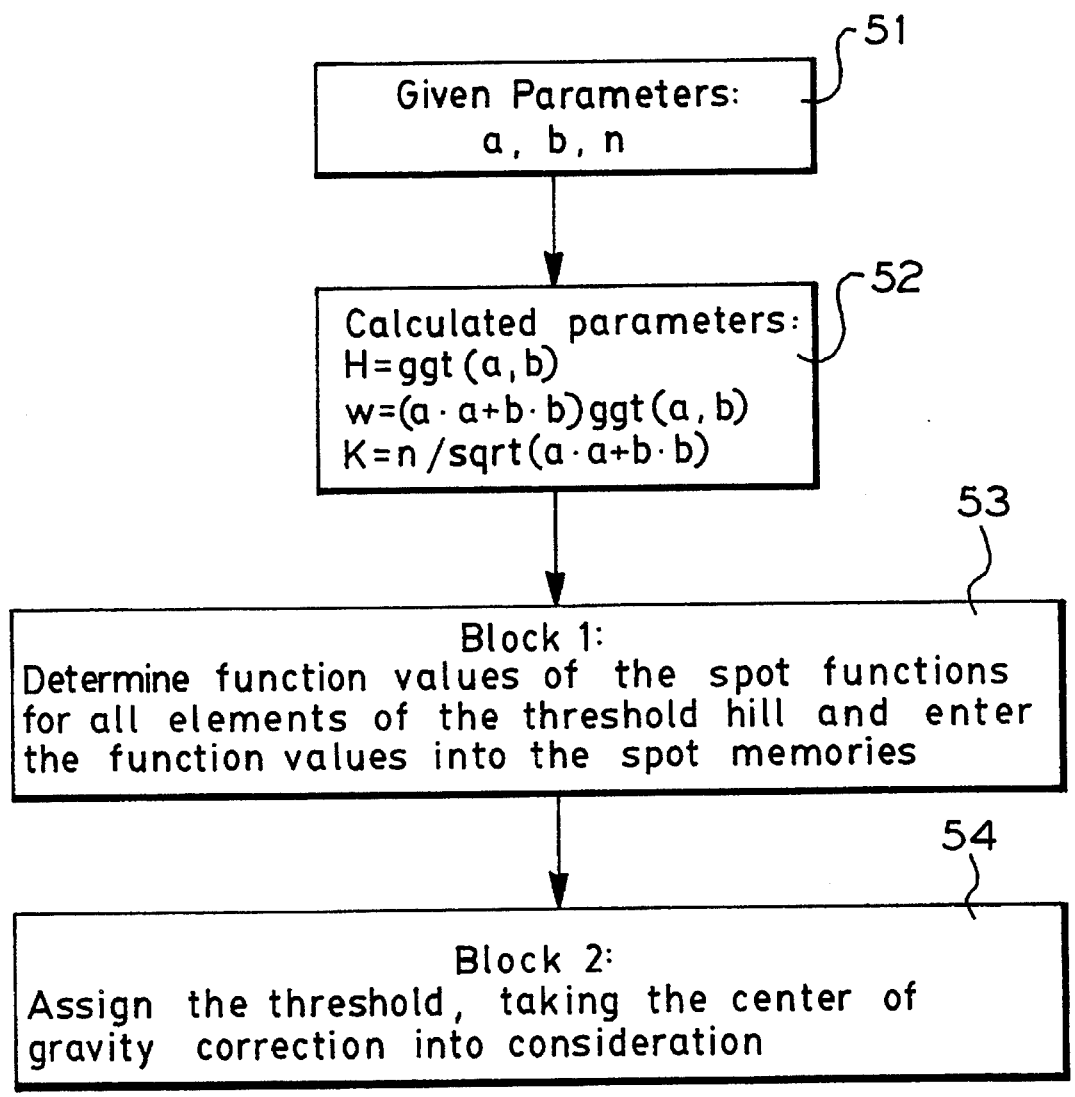
FIG. 6 is a flowchart of the steps for the center of gravity correction.

FIG. 6 schematically shows the flowchart for the center of gravity correction. The afore-mentioned parameters for a, b and n are given, this being referenced 51 in FIG. 6. The values h, w and k are subsequently identified. k indicates the raster width which derives from the following relationship:

$$k = \frac{n}{a \cdot a + b \cdot b}$$

The determination of the values h, w and k is referenced with step 52 in FIG. 6. In step 53, this step 52 is followed by the determination of the function values of the spot function for all elements or, respectively, memory values of the threshold hill and the entry of the function values into the spot memories. After this, the thresholds are assigned in step 54, taking the center of gravity correction into consideration.

Figure 7A:
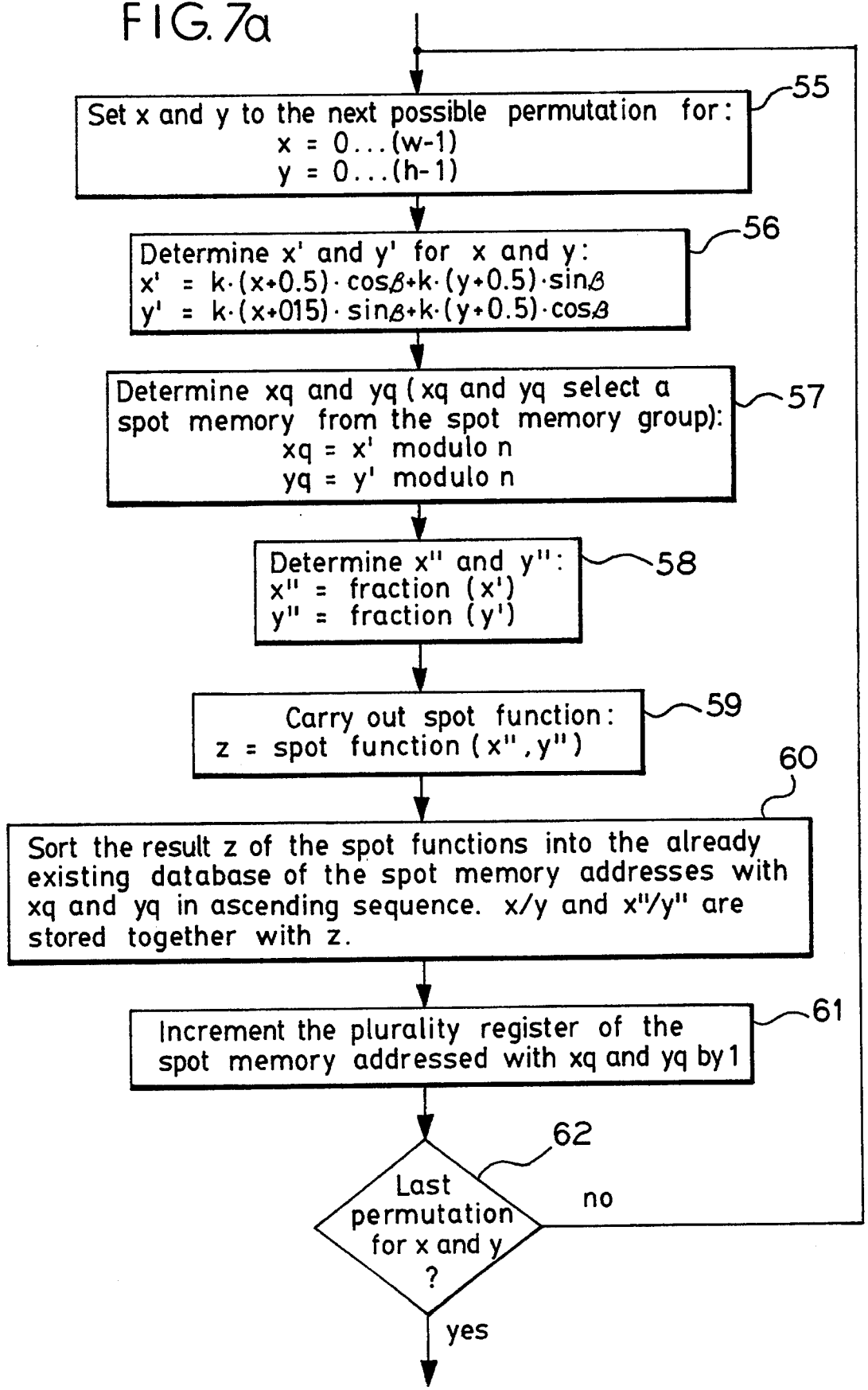
FIGS. 7a and b illustrate a flowchart of the method steps for the center of gravity correction, in detail.

FIGS. 7a and 7b show details of the flowchart.

In a method step 55, the value pairs x, y are generated by the executive sequencer 31. The step 55 is followed by the step 56 for the calculation of the transformed value pairs x′, y′. After this, the value pairs xq and yq are defined as addresses in a step 57. In step 58, the places preceding the decimal point of the value pairs x″ and y″ are cut off.

The spot function value is thus formed from the post-decimal point places in step 59. The respective spot function value is stored in the addressed spot memory together with the value pairs x/y and x′/y′ in the following step 60. The register for the plurality is then incremented by the value 1 in step 61. Following in step 62 is the check to see whether the values w−1 and h−1 are reached. When this is not the case, then a switch to step 55 is made. When, however, this is true, a switch to a step 62 is made, wherein the next possible spot memory is selected from the spot memory group 38. After this, the entry in the current spot memory is selected in step 64, while raising the index number. A step 65 follows, with the calculation of new center of gravity coordinate values. These are checked for upward or downward transgression of the tolerance limit in the next step 66. When they lie within the tolerance limit, step 67 follows with the check to see whether the last entry in the current spot memory is present. When yes, a check is carried out in the further step 68 to see whether this is the last spot memory. When this is true, the method is at an end. When no, a return to step 63 is made.

When the test result in step 66 is negative, then the search of the remaining entries in the spot memory for an element that best corrects the center of gravity follows in step 69, whereby the found element should have at least three neighbors. In the next step 70, the values are rotated from the current entry up to the identified substitute element. Subsequently, in step 70a, the threshold is entered and an element is set in the neighborhood memory 46 before a switch to step 67 is made. When the check result thereof proves negative, a return to step 63 is undertaken.

A further problem of the raster in the range 0± 2 degrees and 40± 2 degrees is a highly differing point closure (with increasing gray scale value, neighboring raster points touch at some point or other. This is referred to as point closure). The point closure occurs for specific positions of the spot boundaries at different gray scale value. This disturbance also tends to form grid lines.

In practice, the device pixels cannot be considered an ideal structure having an exactly quadratic cross section, since the laser beam generates more of a circular spot, whereby the spot is also somewhat too large in diameter in order to achieve a good density of the blackened area. It is therefore necessary for the point closure correction to see to it that all device pixels whose centers lie within an edge zone along the four edges of the spot influence the point closure. The width of the edge zone with the half diagonal of a pixel can be assumed as a theoretical approximation.

In order to implement a point closure correction, it is necessary to make an identification with reference to a model calculation for the given spot function to see what boundary regions of a spot are blackened at which gray scale value.

The correction itself is undertaken in the following way: a check is carried out for every element of the sorted list to see whether it lies in the edge zone that is responsible for the point closure. When yes, then a check is made by comparison to the rated prescriptions of the model calculation to see whether the given pixel blackens the edge region that it covers at the correct point in time (more correctly: at the correct gray scale value). When an error limit is crossed, then a correction begins. Two instances must be distinguished here:

Downward deviation, i.e. the point closure would occur too early. The spot must thus be "displaced" somewhat from the edge. This occurs in that the current element is transposed with list elements that would only be blackened later (more correctly: given a darker gray scale value) and that do not lie in the edge region. The substituted element should continue to have as many neighbors as possible, for the purpose of a compact point shape (not under 3 insofar as possible).

Upward deviations, i.e. the point closure would occur too late. In this case, the spot must be "drawn" somewhat closer to the edge. This occurs in that the current element is transposed with list elements that were actually blackened earlier and that do not lie in the edge region. The neighborhood of the elements to be resorted must thereby likewise be investigated in order to prevent the resorting from leading to the fact that a "hole" is "eaten" into the spot. Only elements that have a maximum of 4 neighbors can be resorted.

Figure 8:
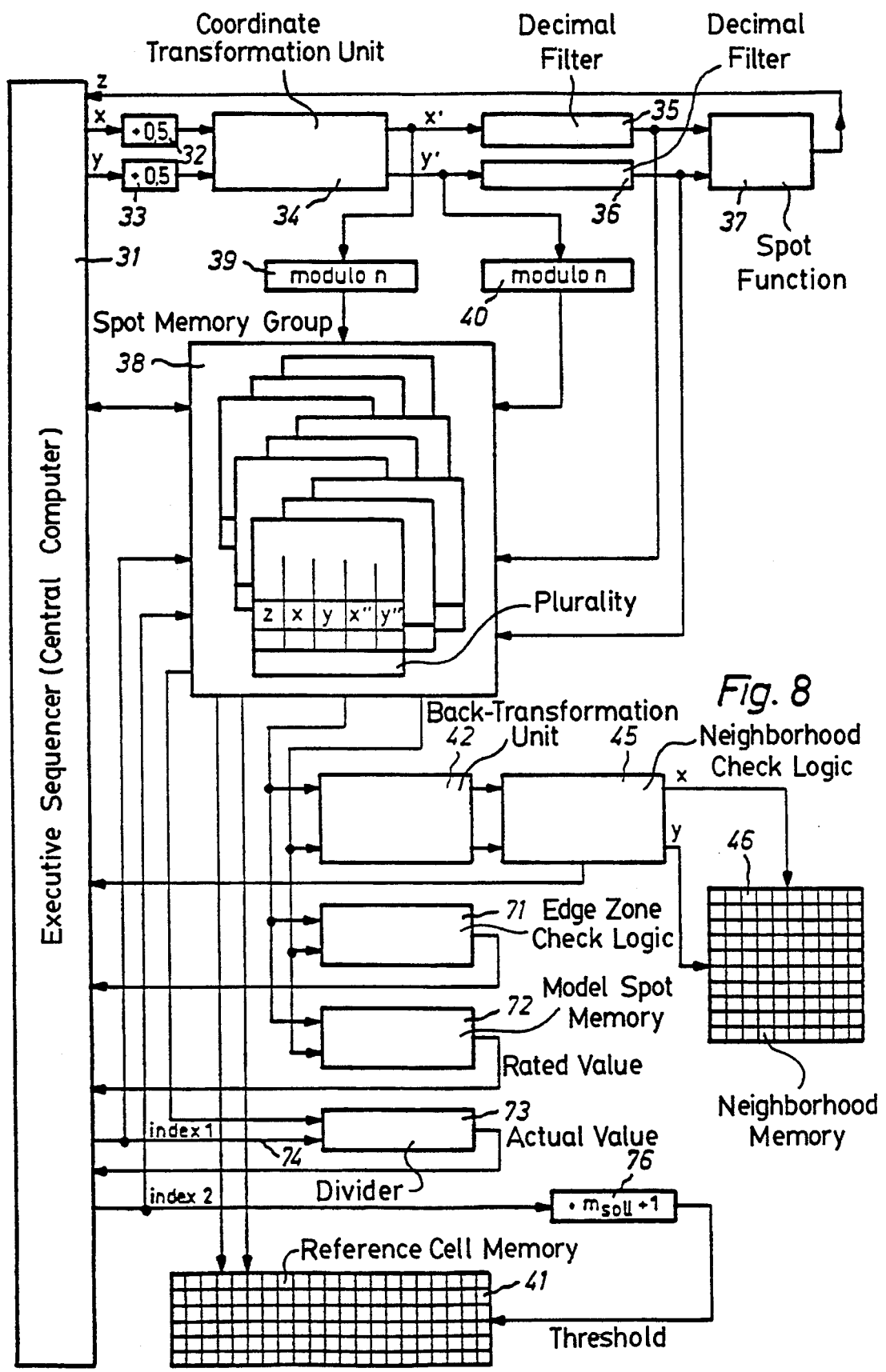
FIG. 8 is a block diagram of an exemplary means for correcting the point closure.

FIG. 8 shows a circuit diagram of an arrangement for a point closure correction. This arrangement is partially identical to that for the center of gravity correction. Identical elements in FIGS. 5 and 8 have been provided with the same reference characters. These are the executive sequencer 31, the adders 32, 33, the coordinate transformation unit 34, the decimal filters 35, 36, the spot function generator 37, the spot memory group 38, the modulo units 39, 40, the reference cell memory 41, the back-transformation unit 42, the neighborhood logic 45 and the neighborhood memory 46. The above description of FIG. 5 is referenced with respect to these elements.

As in the center of gravity correction, the function value is first identified for every individual element of the reference cell.

As set forth above, the formed values z, x/y and x"/y" are sorted in the selected memory block in ascending sequence for the function value z, whereupon the content of the register for the plurality is incremented by the value 1.

In the arrangement shown in FIG. 8, an edge zone check logic 71 and a model spot memory 72 can be applied to the output of the spot memory group 38. The outputs of the edge zone check logic 71 and of the model spot memory 72 are connected to the executive sequencer 31. A divider 73 has its input side connected to the register for the plurality and to an index line 74 of the executive sequencer 31. At its output side, the divider 73 is connected to the executive sequencer 31. An index 2 line 75 of the executive sequencer 31 is connected to a multiplier and adder 76, whose output can be applied to the reference cell memory 41.

Next, the point closure correction is implemented. This occurs in n·n work cycles, whereby one spot memory is handled in every work cycle. In every work cycle, entry-by-entry is sequentially addressed in the selected spot memory by the executive sequencer 31 with an index 1 line. The x" and y" values of the currently addressed entry in the spot memory proceed, first, to the edge zone check logic 71. This decides whether the current element lies in the edge zone or not. x" and y" also proceed to the model spot memory 72. A rated value signal in the range 0 . . . 1 is available at the output thereof. The index 1 is also divided by the divider 73 by the plurality of entries in the current spot memory, and is thus normed to the range 0 . . . 1. When the edge zone logic 71 recognizes "false" then a correction is not required and the executive sequencer 31 proceeds to the next element in the spot memory by increasing index 1. When the edge zone logic 71 recognizes "true", then the executive sequencer 31 compares the signals for the model spot memory 72 and the divider 73. When they are adequately identical, then a correction is likewise not required and a switch to the next element is made. When this is not the case, then another distinction between smaller and larger is made.

In the case of smaller, it is necessary to somewhat displace the spot. For this purpose, the remaining elements of the spot memory are searched for an element that does not lie in the edge zone and has an optimum plurality of neighbors (at least 3). These two elements are then transposed.

In the case of higher, it is necessary to see to it that the current entry is entered closer to the start in the list. For this purpose, the entries that are already assigned are searched from the current position in descending sequence for elements that do not lie in the edge region and have optimally few neighbors. This list dare not yet have been intentionally transposed.

When an element is found, then rotation is carried out in ring-like fashion. Example: current index: 9, found element: 5=> 5 moves to the position 9, 9 to 8, 8 to 7, 7 to 6, 6 to 5. This procedure is repeated (actual value–rated value)·(plurality of entries in the spot memory) times.

Finally, the thresholds are assigned. This occurs in n·n work cycles, whereby one spot memory is handled in every work cycle. In every work cycle, entry-by-entry is sequentially addressed in the selected spot memory by the executive sequencer 31 with the index 2 line 75. The parameters x and y situated in the current entry thereby address an element from the reference cell memory 41 in which index $2 \cdot m_{rated} + 1$ is stored as a threshold.

Figure 9:
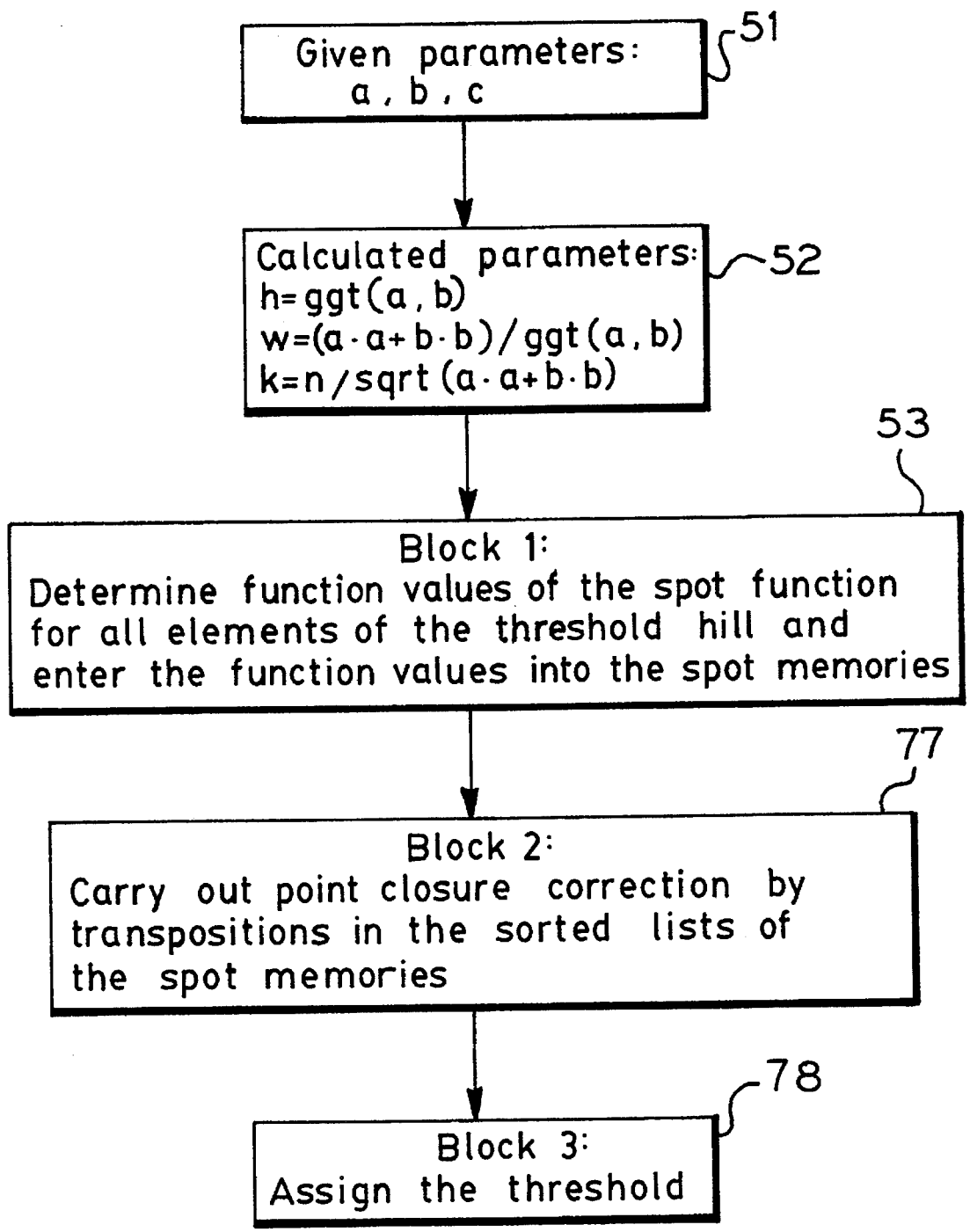
FIG. 9 is a flowchart of the steps for the correction of the point closure.
Figure 10A:
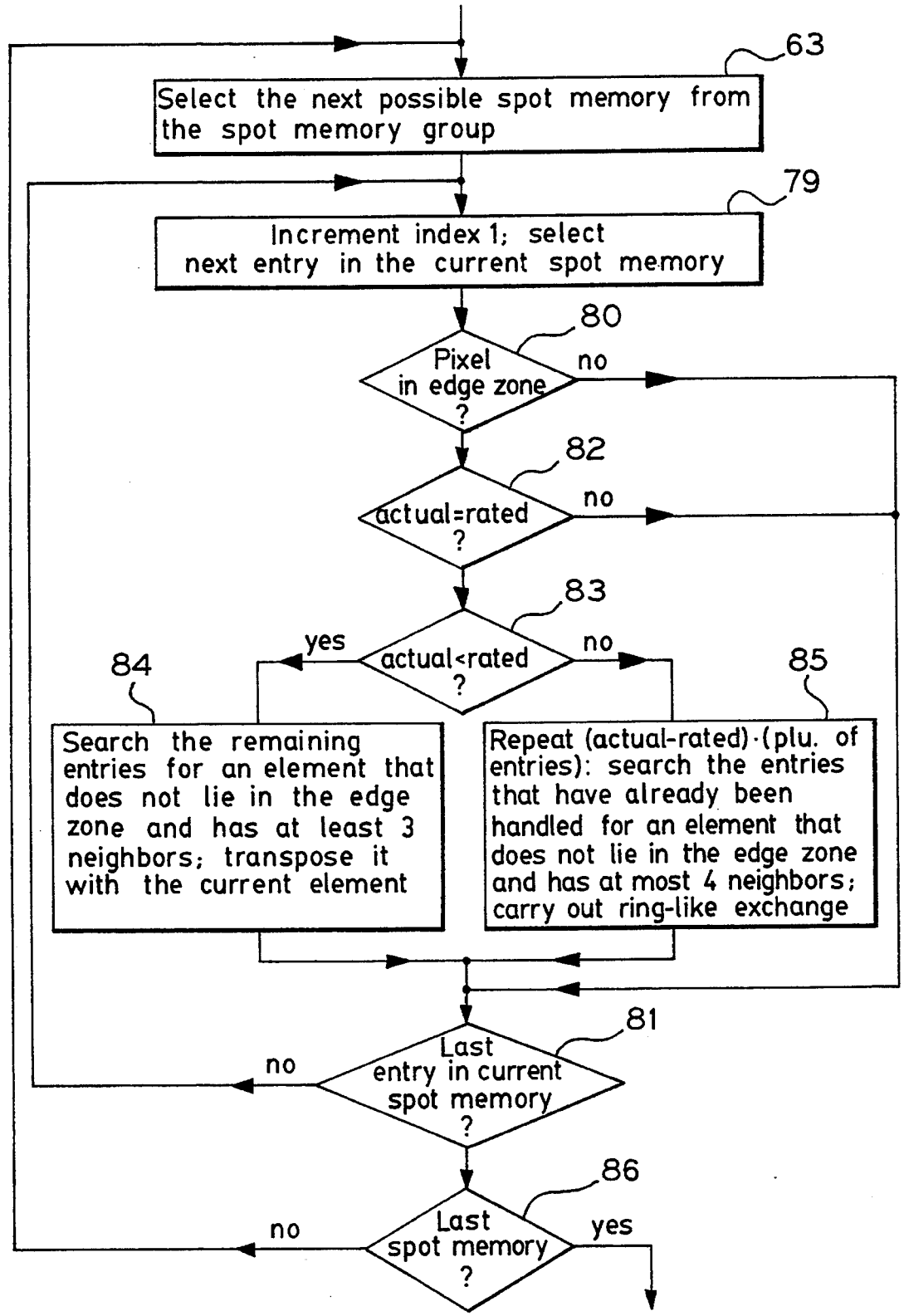
FIGS. 10a and b are a flowchart of the method steps for the correction of the point closure, in detail.
Figure 10B:
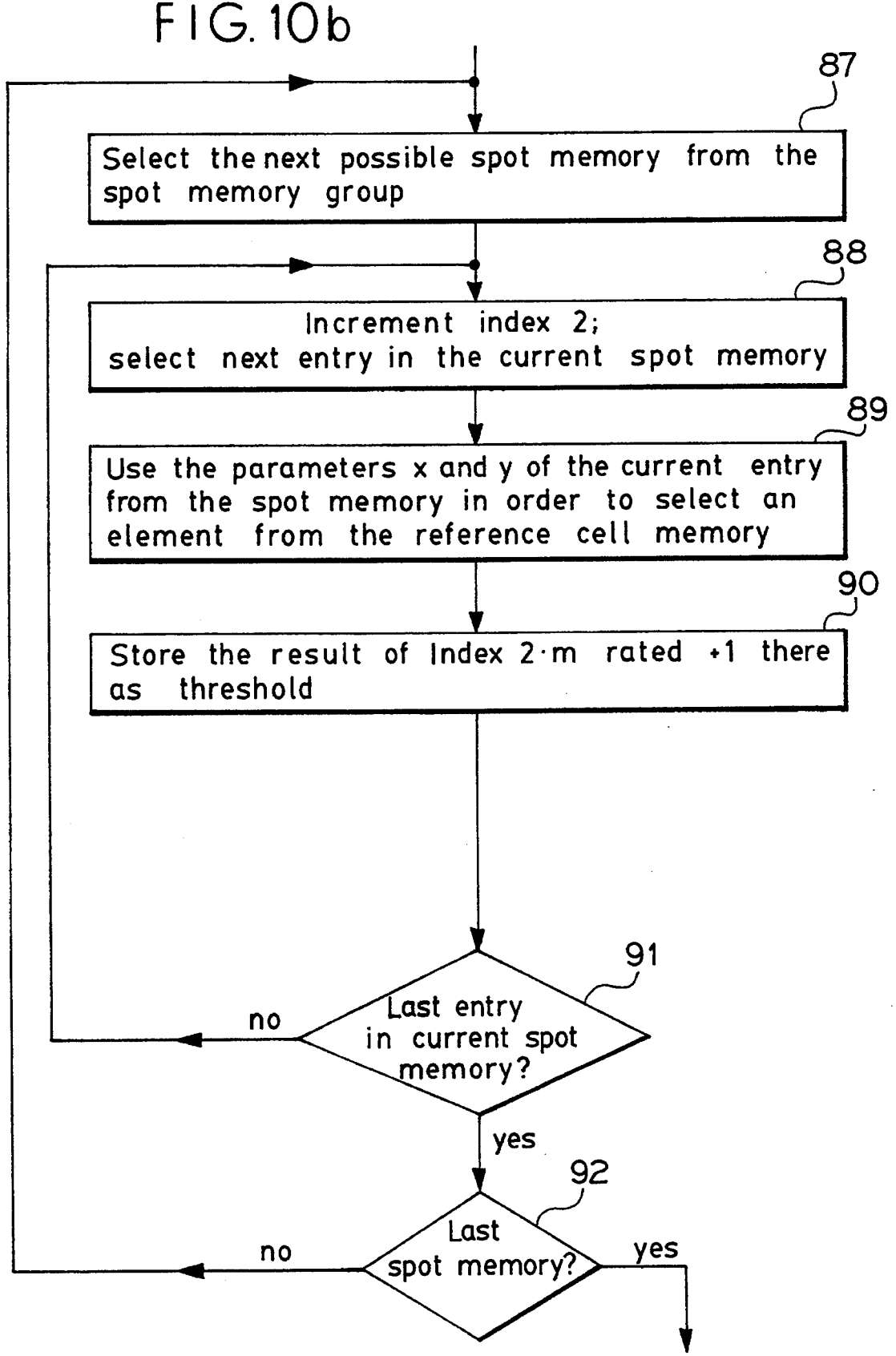

FIG. 9 schematically shows the flowchart for the point closure correction, this coinciding with the flowchart of FIG. 6 with reference to steps 51, 52, 53. In step 77, which follows step 53, the point closure correction is implemented by transpositions in the sorted lists of the spot memories. When this measure has been ended, the thresholds are assigned in the next step 78.

The point closure correction requires the method steps 55, 56, 57, 58, 59, 60, 61, 62 and 63 shown in detail in FIGS. 7a and 7b and set forth above. A more detailed explanation of these steps can therefore be foregone here.

In the point closure correction, a step 79 wherein the index 1 is incremented by 1 follows the step 63, whereupon the next entry in the current spot memory is selected. A check is carried out in the next step 80 to see to whether the corresponding pixel lies in the edge zone. When no, a check is carried out in step 81 to see whether this is a matter of the last entry in the spot memory. When the pixel is located in the edge zone, the check in step 82 follows to see whether the actual value of the threshold corresponds to the rated value according to the model memory 72 within a tolerance limit. When no, step 81 follows. When yes, an identification is made in step 83 to see whether the actual value is lower than the rated value; a switch is then made to a step 84 wherein the remaining entries are searched for an element that does not lie in the edge zone, taking neighboring elements that have already been processed into consideration. After this, the found element is transposed with the current element. When the rated value is lower than the actual value, then a step 85 follows wherein a search is made for an element that does not lie in the edge zone and has neighboring elements that have already been processed, in order to implement a ring-like exchange. Both steps 84, 85 lead to step 81. When a determination is made therein that the last entry in the current spot memory has not been reached, step 63 follows. Otherwise, a step 86 follows wherein a check is carried out to see whether the last spot memory is reached. When no, step 63 follows. When yes, step 87 follows wherein the next-possible spot memory of the spot memory group 38 is selected, whereupon the next entry in the current spot memory is selected in step 88, following index incrementation. In the following step 89, the parameters x, y of the current entry from the spot memory are employed for selecting an element from the reference cell memory 41.

The result of the threshold formation is stored in this element in step 90. Step 90 is followed by an interrogation step 91 for the first current entry in the spot memory. When this is not the case, step 88 follows. When yes, a switch is made to the interrogation step 92 wherein an interrogation for the last spot memory is made. When this is reached, the point closure correction is ended. Otherwise, step 87 follows.

Although various changes and modifications might be suggested by those skilled in the art, it will be understood that I wish to include within the claims of the patent warranted hereon all such changes and modifications as reasonably come within my contribution to the art.

I claim:

1. A method for reducing a disturbing restless pattern providing a restless impression in a half-tone screen separation created by use of a half-tone screen for production of a half-tone image, comprising the steps of:

providing a half-tone screen formed of a super cell, each super cell comprising a plurality of sub-cells, each sub-cell converting a gray tone to a half-tone raster spot according to a spot function, said spot function defining a threshold value for a corresponding element of a plurality of elements within the sub-cell employed to determine whether or not to expose pixels on the screen separation for creation of the half-tone spot within the sub-cell;

during assignment of said threshold values to said corresponding elements of said sub-cell, checking prior to the assignment of a next threshold value to a corresponding element a center of gravity of an area of elements to which the threshold values have already been assigned, and if, given an assignment of said next threshold value to said corresponding element, a center of gravity thereof would deviate from the previous center of gravity by more than a given threshold value, then assigning said next threshold value to a different substitute element of the sub-cell to reduce the deviation;

storing in computer memory the threshold value distribution for each sub-cell to form in memory the half-tone screen, and then using the stored half-tone screen to create the half-tone screen separation, said disturbing restless pattern being reduced or eliminated in said screen separation by insuring that adjacent raster spots on the screen separation are more equally spaced since the center of gravity of the area of the threshold value distribution within the sub-cells employed for creating said raster spots at a particular gray level has a reduced deviation for different gray levels.

2. A method for reducing a disturbing restless pattern providing a restless impression in a half-tone screen separation created by use of a half-tone screen for production of a half-tone image, comprising the steps of:

providing a half-tone screen formed of a super cell, each super cell comprising a plurality of sub-cells, each sub-cell converting a gray tone to a half-tone raster spot according to a spot function, said spot function defining a threshold value for a corresponding element of a plurality of elements within the sub-cell employed to determine whether or not to expose pixels on the screen separation for the creation of the half-tone spot within the sub-cell;

checking assignment of at least one generated threshold value to a corresponding element at an edge of the sub-cell with a generated threshold value assigned to a directly adjacent element at an edge of a neighboring sub-cell to determine whether a point closure has occurred wherein a pixel of said element of said half-tone raster spot of said sub-cell will be blackened at a same gray level as the element in the neighboring sub-cell adjacent element is blackened, and comparing said point closure at said edge to point closures at other edges of said sub-cell with other neighboring sub-cells to determine whether said point closure is occurring either too early or too late in time in comparison with point closures at said other edges of said sub-cell, and if said point closure at said edge occurs either too early or too late, then assigning said generated threshold value to a different element of the sub-cell so that the point closure at said edge does not occur too early or too late in relation to the point closures at the other edges of said sub-cell; and storing in computer memory the threshold value distribution for each sub-cell to form in the memory, the half-tone screen and then using the stored half-tone screen to create the half-tone screen separation, said restless disturbing pattern being reduced or eliminated in said screen separation by insuring that point closures at edges of the raster spot of said sub-cell do not occur too early or too late in relation to one another.

* * * * *